(12) United States Patent
Smith et al.

(10) Patent No.: US 9,297,439 B2
(45) Date of Patent: Mar. 29, 2016

(54) METHOD AND APPARATUS FOR IMPROVED VIBRATION ISOLATION

(75) Inventors: Michael R. Smith, Colleyville, TX (US); Frank B. Stamps, Colleyville, TX (US)

(73) Assignee: Textron Innovations Inc., Providence, RI (US)

( * ) Notice: Subject to any disclaimer, the term of this patent is extended or adjusted under 35 U.S.C. 154(b) by 189 days.

(21) Appl. No.: 13/255,260

(22) PCT Filed: Mar. 12, 2009

(86) PCT No.: PCT/US2009/036871
§ 371 (c)(1),
(2), (4) Date: Sep. 8, 2011

(87) PCT Pub. No.: WO2010/104508
PCT Pub. Date: Sep. 16, 2010

(65) Prior Publication Data
US 2011/0316207 A1 Dec. 29, 2011

(51) Int. Cl.
*F16F 15/027* (2006.01)
*B64C 27/00* (2006.01)
*F16F 7/108* (2006.01)

(52) U.S. Cl.
CPC .............. *F16F 15/027* (2013.01); *B64C 27/001* (2013.01); *F16F 7/108* (2013.01); *B64C 2027/002* (2013.01); *B64C 2027/005* (2013.01); *F16F 2224/0283* (2013.01)

(58) Field of Classification Search
CPC ........................... F16F 15/027; F16F 15/0275
USPC ........ 188/266.1, 266.2, 266.7, 313, 216, 317, 188/318, 316, 322.22; 267/124, 140.11, 267/140.13, 140.15; 244/17.11, 17.27
See application file for complete search history.

(56) References Cited

U.S. PATENT DOCUMENTS

| | | | |
|---|---|---|---|
| 2,819,131 A | 5/1955 | Lankford | |
| 2,964,272 A | 7/1955 | Olson | |
| 3,088,062 A | 4/1963 | Hudimac | |
| 3,109,520 A * | 11/1963 | Vossieck | 188/322.22 |
| 4,236,607 A | 12/1980 | Halwes et al. | |
| 4,452,437 A | 6/1984 | Lochner | |
| 4,600,863 A | 7/1986 | Chaplin et al. | |
| 4,629,039 A | 12/1986 | Imoto et al. | |
| 4,695,226 A | 9/1987 | Marchitto | |
| 4,723,085 A | 2/1988 | Mukohjima et al. | |

(Continued)

FOREIGN PATENT DOCUMENTS

| | | | |
|---|---|---|---|
| CA | 2182275 A1 | 6/1996 | |
| CA | 2209477 C * | 3/2005 | |

(Continued)

OTHER PUBLICATIONS

Extended European Search Report in related European Application No. 09841621, 8 pages, mailed Mar. 4, 2013.

(Continued)

*Primary Examiner* — Thomas J Williams
(74) *Attorney, Agent, or Firm* — James E. Walton (57) ABSTRACT

A vibration isolator having a housing defining a fluid chamber, piston assembly, tuning passage, and a switchable fluid path assembly for changing the isolation frequency of the vibration isolator. The piston assembly is resiliently disposed within the housing. A vibration tuning fluid is allowed to flow within the housing. Actuation of a valve in the switchable fluid path assembly selectively controls fluid flow within the fluid path of the switchable fluid path assembly.

16 Claims, 7 Drawing Sheets

(56) References Cited

U.S. PATENT DOCUMENTS

| | | | |
|---|---|---|---|
| 4,725,019 | A | 2/1988 | White |
| 4,869,474 | A | 9/1989 | Best et al. |
| 5,022,628 | A | 6/1991 | Johnson et al. |
| 5,130,948 | A | 7/1992 | Laukien et al. |
| 5,174,552 | A | 12/1992 | Hodgson et al. |
| 5,265,552 | A | 11/1993 | Taylor |
| 5,332,203 | A | 7/1994 | Gossman et al. |
| 5,435,531 | A | 7/1995 | Smith et al. |
| 5,439,082 | A | 8/1995 | McKeown et al. |
| 5,458,222 | A | 10/1995 | Pla et al. |
| 5,520,375 | A | 5/1996 | Leibach et al. |
| 5,568,847 | A | 10/1996 | Guilloud et al. |
| 5,704,596 | A | 1/1998 | Smith et al. |
| 5,732,905 | A | 3/1998 | Krysinski |
| 5,788,372 | A | 8/1998 | Jones et al. |
| 5,803,213 | A | 9/1998 | Davis et al. |
| 5,848,782 | A | 12/1998 | Hein et al. |
| 5,906,254 | A | 5/1999 | Schmidt et al. |
| 5,927,699 | A | 7/1999 | Nakajima et al. |
| 5,947,457 | A | 9/1999 | Swanson et al. |
| 5,957,440 | A | 9/1999 | Jones et al. |
| 6,009,983 | A | 1/2000 | Stamps et al. |
| 6,032,936 | A | 3/2000 | Redinger |
| 6,116,179 | A | 9/2000 | Swinbanks et al. |
| 6,123,312 | A | 9/2000 | Dai |
| 6,129,306 | A | 10/2000 | Pham |
| 6,217,011 | B1 | 4/2001 | Redinger |
| 6,293,532 | B2 | 9/2001 | McGuire |
| 6,340,153 | B1 | 1/2002 | Miesner |
| 6,389,941 | B1 | 5/2002 | Michler |
| 6,394,432 | B1 | 5/2002 | Whiteford |
| 6,427,815 | B1 | 8/2002 | Zeller |
| 6,454,206 | B2 | 9/2002 | Vincent |
| 6,695,106 | B2 | 2/2004 | Smith |
| 6,926,500 | B2 * | 8/2005 | Ferullo .................. 188/318 |
| 7,013,832 | B2 | 3/2006 | Sexton et al. |
| 7,044,489 | B2 * | 5/2006 | Bunya et al. ............. 280/272 |
| 7,213,799 | B2 * | 5/2007 | Behmenburg et al. ..... 267/64.24 |
| 2002/0060268 | A1 | 5/2002 | Smith et al. |
| 2008/0237438 | A1 * | 10/2008 | Seelmann et al. .......... 248/619 |
| 2012/0180200 | A1 * | 7/2012 | Gaudet ................ 267/140.13 |

FOREIGN PATENT DOCUMENTS

| | | |
|---|---|---|
| CA | 2422391 A1 | 2/2007 |
| CA | 2485830 A1 | 2/2007 |
| DE | 4407962 C1 | 6/1995 |
| DE | 69113805 T2 | 4/1996 |
| EP | 0290181 A | 11/1988 |
| EP | 0351537 A2 | 1/1990 |
| EP | 0528592 A1 | 2/1993 |
| EP | 0537927 B1 | 4/1993 |
| EP | 0554057 | 8/1993 |
| EP | 0760437 A | 3/1997 |
| EP | 1334289 B1 | 8/2003 |
| EP | 1878941 A1 | 1/2008 |
| FR | 2703121 | 9/1994 |
| GB | 2358900 A | 8/2001 |
| JP | 61171686 | 2/1986 |
| WO | 83/03700 A1 | 10/1983 |
| WO | 88/05506 | 7/1988 |
| WO | 89/05930 A1 | 6/1989 |
| WO | 91/15687 A1 | 10/1991 |
| WO | 03/104675 A | 12/2003 |
| WO | WO 2004030955 A1 * | 4/2004 |

OTHER PUBLICATIONS

International Preliminary Report on Patentability of the International Searching Authority mailed by ISA/USA, U.S. Patent and Trademark Office on Nov. 18, 2011 for International Patent Application No. PCT/US08/87419, 4 pages.

International Search Report and the Written Opinion of the International Searching Authority mailed by ISA/USA, U.S. Patent and Trademark Office on Jan. 28, 2010 for International Patent Application No. PCT/US09/66263, 8 pages.

Chinese First Office Action in Chinese counterpart Application No. 200910225341.8, issued by State Intellectual Property Office of the People's Republic of China, Sep. 1, 2011.

Office Action from U.S. Patent and Trademark Office on Nov. 10, 2011 from corresponding U.S. Appl. No. 10/528,920.

Office Action from U.S. Patent and Trademark Office on Jul. 26, 2011 from corresponding U.S. Appl. No. 10/528,920.

Office Action from U.S. Patent and Trademark Office on Mar. 29, 2011 from corresponding U.S. Appl. No. 10/528,920.

Office Action from U.S. Patent and Trademark Office on Oct. 21, 2010 from corresponding U.S. Appl. No. 10/528,920.

Office Action in Canadian counterpart Application No. 2,497,417, issued by Canadian Intellectual Property Office, Jan. 15, 2010.

International Search Report and Written Opinion for PCT/US07/79686 dated Sep. 10, 2008.

International Preliminary Report on Patentability for PCT/US07/79686 dated Dec. 10, 2010.

First Office Action in Chinese Application No. 200780100866.8 by Chinese Patent Office, dated Apr. 25, 2011.

Office Action in Canadian counterpart Application No. 2,497,417, issued by Canadian Intellectual Property Office, Dec. 16, 2010.

European Search Report in European counterpart Application No. 09169361.4, issued by European Patent Office, Dec. 9, 2010.

Nixon M.W. et al, Tiltrotor Vibration Reduction Through Higher Harmonic Control, Journal of the American Helicopter Society, Jul. 1998, 235-245, vol. 43, No. 3, Alexandria, VA, US.

European Search Report in European counterpart Application No. 09169320, completed by European Patent Office, Dec. 14, 2010, 3 pages.

European Search Report in European counterpart Application No. 09169354, completed by European Patent Office, Dec. 14, 2010, 7 pages.

European Search Report in European counterpart Application No. 09169360.6, issued by European Patent Office, Dec. 30, 2010, 8 pages.

European Search Report in European counterpart Application No. 09169365, completed by European Patent Office, Dec. 14, 2010, 7 pages.

European Search Report in European counterpart Application No. 09169361, completed by European Patent Office, Dec. 9, 2010, 6 pages.

Notice of Allowance in Canadian counterpart Application No. 2,497,417, issued by Canadian Intellectual Property Office, Jul. 6, 2011.

European Search Report in European counterpart Application No. 03816302.8, completed by European Patent Office, Jul. 27, 2006, 7 pages.

International Preliminary Examination Report of the International Preliminary Examination Authority mailed by ISA/USA, U.S. Patent and Trademark Office on Jul. 1, 2005 for International Patent Application No. PCT/US03/30324, 7 pages.

International Search Report and Written Opinion of the International Searching Authority mailed by ISA/USA, U.S. Patent and Trademark Office on Jan. 25, 2010 for International Patent Application No. PCT/US09/36871.

International Search Report and Written Opinion of the International Searching Authority mailed by ISA/USA, U.S. Patent and Trademark Office on Feb. 3, 2009 for International Patent Application No. PCT/US08/87419.

Office Action in Canadian counterpart Application No. 2,754,205, issued by Canadian Intellectual Property Office, May 6, 2013.

Office Action in related Chinese Application No. 2009801580425, issued by Chinese Patent Office, Jul. 26, 2013, 8 pages.

Examination report in related Canadian patent application No. 2,754,205, mailed Mar. 10, 2014, 2 pages.

Office Action in related Chinese Application No. 200980158042.5, issued by Chinese Patent Office, Mar. 18, 2014, 4 pages.

* cited by examiner

METHOD AND APPARATUS FOR IMPROVED VIBRATION ISOLATION

TECHNICAL FIELD

The present application relates in general to active vibration control. More specifically, the present application relates to methods and apparatus for isolating mechanical vibrations in structures or bodies that are subject to harmonic or oscillating displacements or forces. The present application is well suited for use in the field of aircraft, in particular, helicopters and other rotary wing aircraft.

DESCRIPTION OF THE PRIOR ART

For many years, effort has been directed toward the design of apparatus for isolating a vibrating body from transmitting its vibrations to another body. Such apparatuses are useful in a variety of technical fields in which it is desirable to isolate the vibration of an oscillating or vibrating device, such as an engine, from the remainder of the structure. Typical vibration isolation and attenuation devices ("isolators") employ various combinations of the mechanical system elements (springs and mass) to adjust the frequency response characteristics of the overall system to achieve acceptable levels of vibration in the structures of interest in the system. One field in which these isolators find a great deal of use is in aircraft, wherein vibration-isolation systems are utilized to isolate the fuselage or other portions of an aircraft from mechanical vibrations, such as harmonic vibrations, which are associated with the propulsion system, and which arise from the engine, transmission, and propellers or rotors of the aircraft.

Vibration isolators are distinguishable from damping devices in the prior art that are erroneously referred to as "isolators." A simple force equation for vibration is set forth as follows:

$$F = m\ddot{x} + c\dot{x} + kx$$

A vibration isolator utilizes inertial forces ($m\ddot{x}$) to cancel elastic forces ($kx$). On the other hand, a damping device is concerned with utilizing dissipative effects ($c\dot{x}$) to remove energy from a vibrating system.

One important engineering objective during the design of an aircraft vibration-isolation system is to minimize the length, weight, and overall size including cross-section of the isolation device. This is a primary objective of all engineering efforts relating to aircraft. It is especially important in the design and manufacture of helicopters and other rotary wing aircraft, such as tilt rotor aircraft, which are required to hover against the dead weight of the craft, and which are, thus, somewhat constrained in their payload in comparison with fixed-wing aircraft.

Another important engineering objective during the design of vibration-isolation systems is the conservation of the engineering resources that have been expended in the design of other aspects of the aircraft or in the vibration-isolation system. In other words, it is an important industry objective to make incremental improvements in the performance of vibration isolation systems which do not require radical re-engineering or complete redesign of all of the components which are present in the existing vibration-isolation systems.

A marked departure in the field of vibration isolation, particularly as applied to aircraft and helicopters is disclosed in commonly assigned U.S. Pat. No. 4,236,607, titled "Vibration Suppression System," issued 2 Dec. 1980, to Halwes, et al. (Halwes '607). Halwes '607 is incorporated herein by reference. Halwes '607 discloses a vibration isolator, in which a dense, low-viscosity fluid is used as the "tuning" mass to counterbalance, or cancel, oscillating forces transmitted through the isolator. This isolator employs the principle that the acceleration of an oscillating mass is 180° out of phase with its displacement.

In Halwes '607, it was recognized that the inertial characteristics of a dense, low-viscosity fluid, combined with a hydraulic advantage resulting from a piston arrangement, could harness the out-of-phase acceleration to generate counter-balancing forces to attenuate or cancel vibration. Halwes '607 provided a much more compact, reliable, and efficient isolator than was provided in the prior art. The original dense, low-viscosity fluid contemplated by Halwes '607 was mercury, which is toxic and highly corrosive.

Since Halwes' early invention, much of the effort in this area has been directed toward replacing mercury as a fluid or to varying the dynamic response of a single isolator to attenuate differing vibration modes. An example of the latter is found in commonly assigned U.S. Pat. No. 5,439,082, titled "Hydraulic Inertial Vibration Isolator," issued 8 Aug. 1995, to McKeown, et al. (McKeown '082). McKeown '082 is incorporated herein by reference.

Several factors affect the performance and characteristics of the Halwes-type isolator, including the density and viscosity of the fluid employed, the relative dimensions of components of the isolator, and the like. One improvement in the design of such isolators is disclosed in commonly assigned U.S. Pat. No. 6,009,983, titled "Method and Apparatus for Improved Isolation," issued 4 Jan. 2000, to Stamps et al. (Stamps '983). In Stamps '983, a compound radius at the each end of the tuning passage was employed to provide a marked improvement in the performance of the isolator. Stamps '983 is incorporated herein by reference.

Another area of improvement in the design of the Halwes-type isolator has been in an effort directed toward a means for changing the isolator's frequency in order to increase the isolator's effectiveness during operation. One development in the design of such isolators is disclosed in commonly assigned U.S. Pat. No. 5,435,531, titled "Vibration Isolation System," issued 25 Jul. 1995, to Smith et al. (Smith '531). In Smith '531, an axially extendable sleeve is used in the inner wall of the tuning passage in order to change the length of the tuning passage, thereby changing the isolation frequency. Another development in the design of tunable Halwes-type isolators was disclosed in commonly assigned U.S. Pat. No. 5,704,596, titled "Vibration Isolation System," issued 6 Jan. 1998, to Smith et al. (Smith '596). In Smith '596, a sleeve is used in the inner wall of the tuning passage in order to change the cross sectional area of the tuning passage itself, thereby changing the isolation frequency during operation. Both Smith '531 and Smith '596 were notable attempts to actively tune the isolator.

Another development in the area of vibration isolation is the tunable vibration isolator disclosed in U.S. Pat. No. 6,695,106, titled "Method and Apparatus for Improved Vibration Isolation," issued 24 Feb. 2004, to Smith et al, which is hereby incorporated by reference.

Although the foregoing developments represent great strides in the area of vibration isolation, many shortcomings remain.

BRIEF DESCRIPTION OF THE DRAWINGS

The novel features believed characteristic of the application are set forth in the appended claims. However, the application itself, as well as, a preferred mode of use, and further objectives and advantages thereof, will best be understood by reference to the following detailed description when read in conjunction with the accompanying drawings, wherein:

DESCRIPTION OF THE PREFERRED EMBODIMENT

Figure 1:
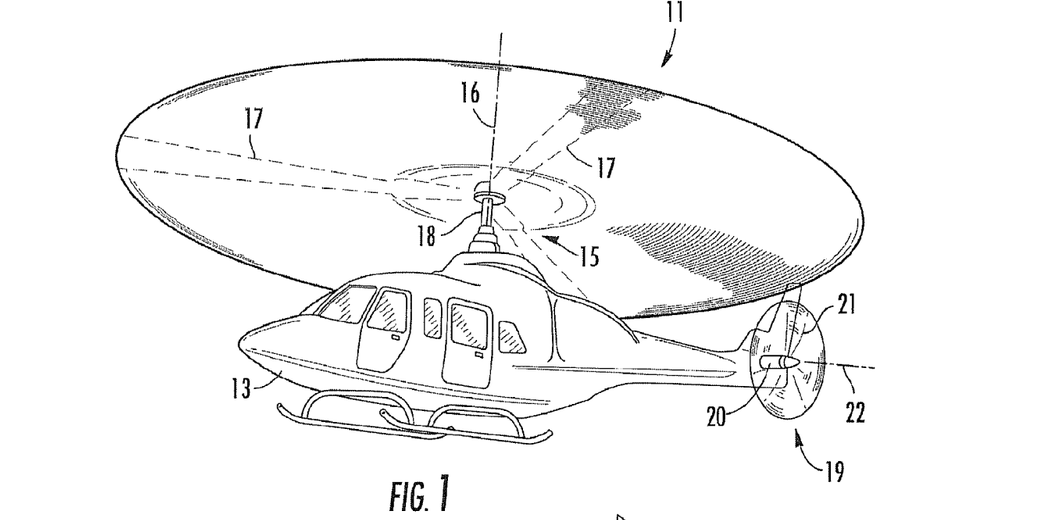
FIG. 1 is a perspective view of a helicopter according to the present application.

Referring to FIG. 1 in the drawings, a helicopter 11 according to the present application is illustrated. Helicopter 11 has a fuselage 13 and a main rotor assembly 15, including main rotor blades 17 and a main rotor shaft 18. Helicopter 11 has a tail rotor assembly 19, including tail rotor blades 21 and a tail rotor shaft 20. Main rotor blades 17 generally rotate about a vertical axis 16 of main rotor shaft 18. Tail rotor blades 21 generally rotate about a lateral axis 22 of tail rotor shaft 20. Helicopter 11 also includes a vibration isolation system according to the present application for isolating fuselage 13 or other portions of helicopter 11 from mechanical vibrations, such as harmonic vibrations, which are associated with the propulsion system and which arise from the engine, transmission, and rotors of helicopter 11.

Figure 2A:
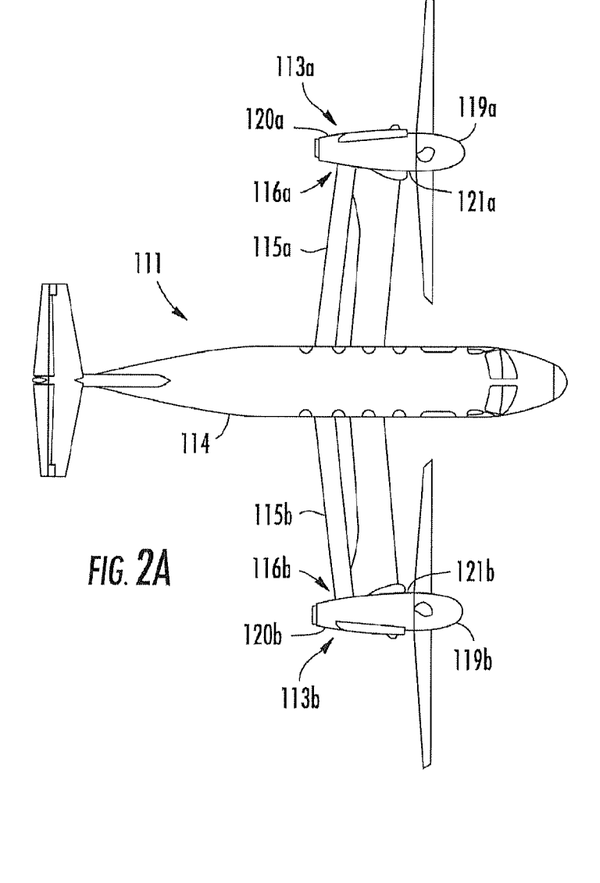
FIG. 2A is a plan view of a tilt rotor aircraft according to the present application in an airplane mode.
Figure 2B:
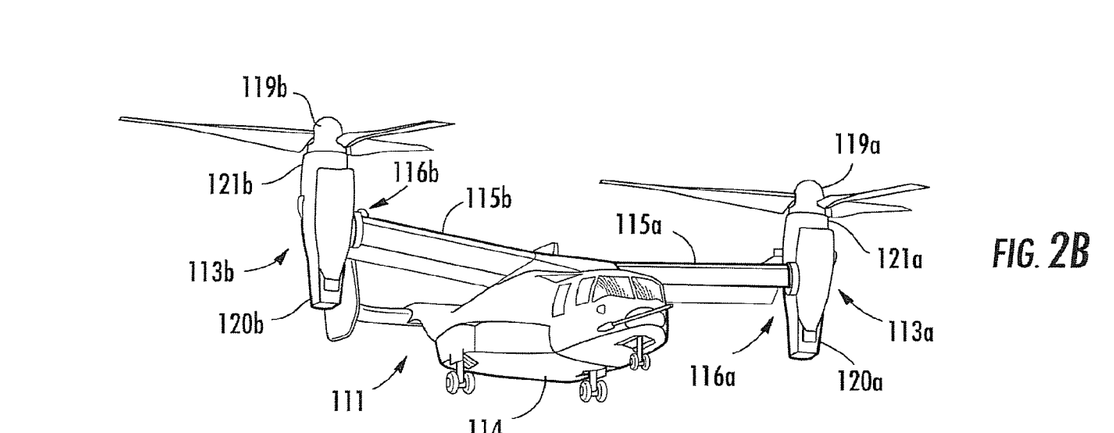
FIG. 2B is a perspective view of a tilt rotor aircraft according to the present application in a helicopter mode.

The present application may also be utilized on other types of rotary wing aircraft. Referring now to FIGS. 2A and 2B in the drawings, a tilt rotor aircraft 111 according to the present application is illustrated. As is conventional with tilt rotor aircraft, rotor assemblies 113a and 113b are carried by wings 115a and 115b, and are disposed at end portions 116a and 116b of wings 115a and 115b, respectively. Tilt rotor assemblies 113a and 113b include nacelles 120a and 120b, which carry the engines and transmissions of tilt rotor aircraft 111, as well as, rotor hubs 119a and 119b on forward ends 121a and 121b of tilt rotor assemblies 113a and 113b, respectively.

Tilt rotor assemblies 113a and 113b move or rotate relative to wing members 115a and 115b between a helicopter mode in which tilt rotor assemblies 113a and 113b are tilted upward, such that tilt rotor aircraft 111 flies like a conventional helicopter; and an airplane mode in which tilt rotor assemblies 113a and 113b are tilted forward, such that tilt rotor aircraft 111 flies like a conventional propeller driven aircraft. In FIG. 2A, tilt rotor aircraft 111 is shown in the airplane mode; and in FIG. 2B, tilt rotor aircraft 111 is shown in the helicopter mode. As shown in FIGS. 2A and 2B, wings 115a and 115b are coupled to a fuselage 114. Tilt rotor aircraft 111 also includes a vibration isolation system according to the present application for isolating fuselage 114 or other portions of tilt rotor aircraft 111 from mechanical vibrations, such as harmonic vibrations, which are associated with the propulsion system and which arise from the engines, transmissions, and rotors of tilt rotor aircraft 111.

Figure 3:
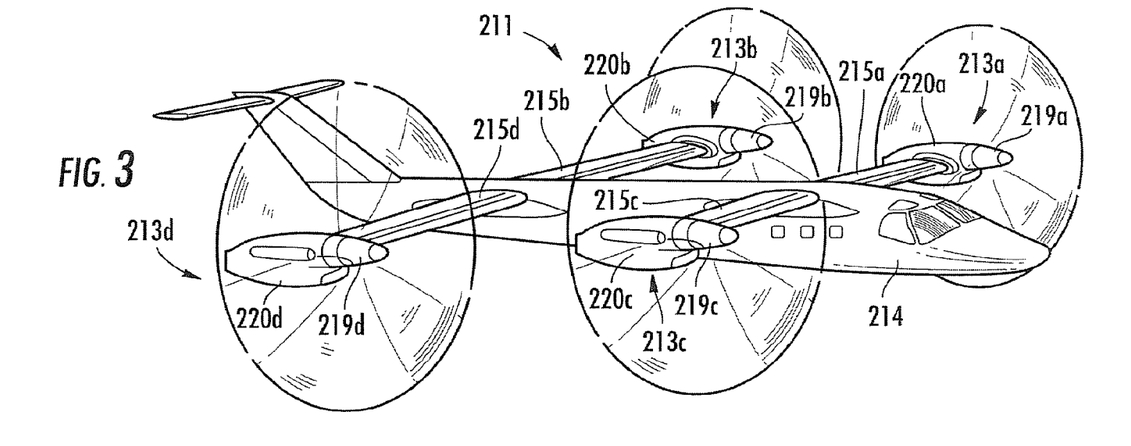
FIG. 3 is a perspective view of a quad tilt rotor aircraft according to the present application in an airplane mode.

Referring now to FIG. 3 in the drawings, a quad tilt rotor aircraft 211 according to the present application is illustrated. As with the tilt rotor aircraft 111 of FIGS. 2A and 2B, rotor assemblies 213a, 213b, 213c, and 213d are carried by a forward wing 215a, 215c, and an aft wing 215b, 215d, respectively. Tilt rotor assemblies 213a, 213b, 213c, and 213d include nacelles 220a, 220b, 220c, and 220d, which carry the engines and transmissions of quad tilt rotor aircraft 211, as well as, rotor hubs 219a, 219b, 219c, and 219d on forward ends of tilt rotor assemblies 213a, 213b, 213c, and 213d, respectively.

Tilt rotor assemblies 213a, 213b, 213c, and 213d move or rotate relative to wing members 215a, 215b, 215c, and 215d between a helicopter mode in which tilt rotor assemblies 213a, 213b, 213c, and 213d are tilted upward, such that quad tilt rotor aircraft 211 flies like a conventional helicopter; and an airplane mode in which tilt rotor assemblies 213a, 213b, 213c, and 213d are tilted forward, such that quad tilt rotor aircraft 211 flies like a conventional propeller driven aircraft. In FIG. 3, quad tilt rotor aircraft 111 is shown in the airplane mode. As shown in FIG. 3, wings 215a, 215b, 215c, and 215d are coupled to a fuselage 214. Tilt rotor aircraft 211 also includes a vibration isolation system according to the present application for isolating fuselage 214 or other portions of quad tilt rotor aircraft 211 from mechanical vibrations, such as harmonic vibrations, which are associated with the propulsion system and which arise from the engines, transmissions, and rotors of quad tilt rotor aircraft 211. It should be understood that the present application may be used with any aircraft on which it would be desirable to have vibration isolation according to the present application, including unmanned aerial vehicles that are remotely piloted.

Figure 4A:
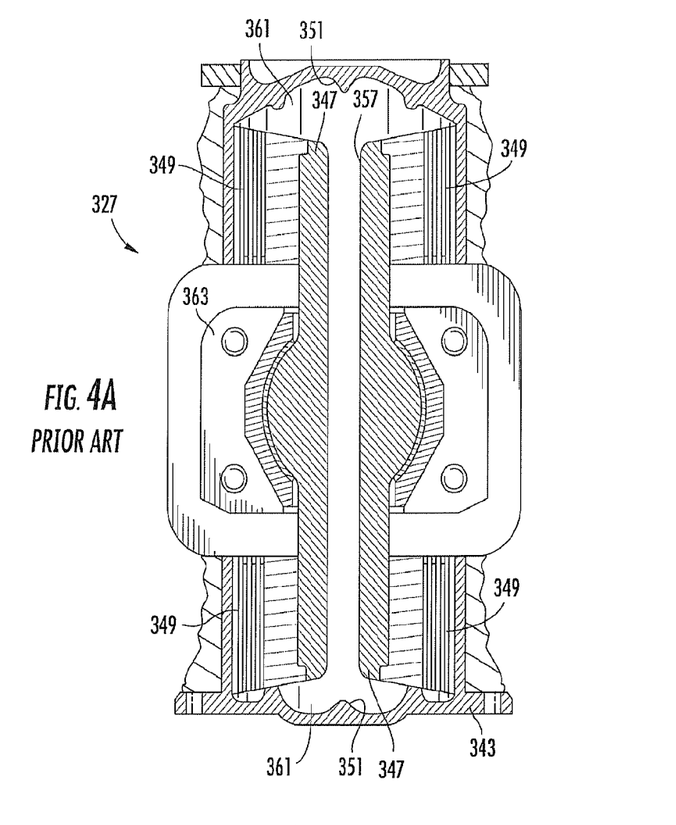
FIG. 4A is a cross-sectional view of a prior art liquid inertia vibration eliminator.

Referring now to FIG. 4A in the drawings, a prior art liquid inertia vibration eliminator (LIVE unit) 327 for use on an aircraft is illustrated. Prior art LIVE unit 327 includes a housing 343 that has a hollow, generally cylindrical interior. A piston 347 of selected cross-sectional diameter is disposed within the interior of housing 343. Housing 343 would typically be coupled to the fuselage of an aircraft (not shown) and piston 347 would typically be coupled to the transmission and propulsion system of the aircraft (not shown) via a pylon assembly at an attachment bracket 363. In such an arrangement, the fuselage serves as the body to be isolated from vibration, and the transmission of the aircraft serves as the vibrating body. An elastomeric seal and spring member 349 resiliently seals piston 347 within the interior of housing 343.

A fluid chamber 361 is defined by the interior of housing 343 and piston 347 and is sealed against leakage by elastomer member 349. A relatively high-density, low-viscosity vibration-isolation fluid, also referred to as tuning fluid, is disposed within fluid chamber 361. In addition to sealing the vibration-isolation fluid in fluid chamber 361, elastomer member 349 functions as a spring to permit piston 347 to move or oscillate relative to housing 343, while maintaining piston 347 in a central location in housing 343 when no load is applied.

A tuning port or passage 357 extends centrally through piston 347 and permits the vibration-isolation fluid to move from one end of fluid chamber 361 to the other. A conical flow diverter 351 is provided at each end of housing 343 and is aligned with and generally opposes the opening at each end of tuning passage 357. Each conical flow diverter 351 enhances fluid flow by decelerating the vibration-isolation fluid as it flows from each end of the fluid chamber into and out of passage 357.

Figure 4B:
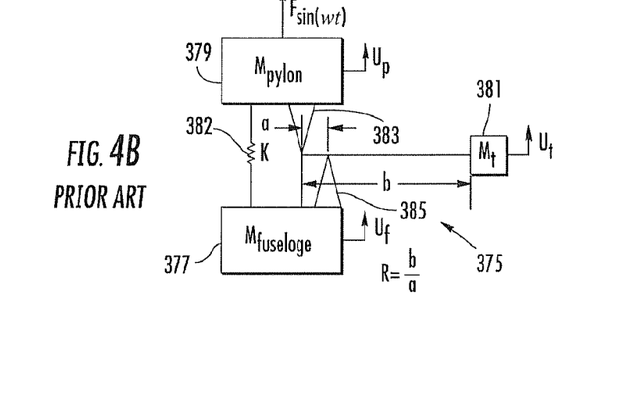
FIG. 4B is a force diagram of the prior art liquid inertia vibration eliminator of FIG. 4A.

Referring now to FIG. 4B in the drawings, a mechanical equivalent model 375 for the prior art LIVE unit 327 of FIG. 4A is illustrated. In mechanical equivalent model 375, a box 377 represents the mass of the fuselage $M_{fuselage}$; a box 379 represents the mass of the pylon assembly $M_{pylon}$; and a box 381 represents the mass of the tuning mass $M_t$, in this case, the vibration-isolation fluid. A vibratory force $F \cdot \sin(\omega t)$ is generated by the engine, transmission, and propulsion system. Force $F \cdot \sin(\omega t)$ is a function of the frequency of vibration of the transmission and propulsion system.

Force $F \cdot \sin(\omega t)$ causes an oscillatory displacement $u_p$ of the pylon assembly; an oscillatory displacement of the fuselage $u_f$; and an oscillatory displacement of the tuning mass $u_t$. Elastomer member 349 is represented by a spring 382 disposed between the fuselage $M_{fuselage}$ and the pylon assembly $M_{pylon}$. Spring 382 has a spring constant K.

In mechanical equivalent model 375, tuning mass $M_t$ functions as if cantilevered from a first fulcrum 383 attached to the pylon assembly $M_{pylon}$, and a second fulcrum 385 attached to the fuselage $M_{fuselage}$. The distance a from first fulcrum 383 to second fulcrum 385 represents the cross-sectional area of tuning port 357, and the distance b from first fulcrum 383 to the tuning mass $M_t$ represents the effective cross-sectional area of piston 347, such that an area ratio, or hydraulic ratio, R is equal to the ratio of b to a. Mechanical equivalent model 375 leads to the following equation of motion for the system:

$$\begin{bmatrix} M_{pylon} + (R-1)^2 M_t & -R(R-1)M_t \\ -R(R-1)M_t & M_{fuselage} + R^2 M_t \end{bmatrix} \begin{Bmatrix} \ddot{u}_p \\ \ddot{u}_f \end{Bmatrix} + \begin{bmatrix} K & -K \\ -K & K \end{bmatrix} \begin{Bmatrix} u_p \\ u_f \end{Bmatrix} = \begin{Bmatrix} F\sin(\omega t) \\ 0 \end{Bmatrix}$$

As is evident, no means for actively tuning LIVE unit 327 is available. Once the cross-sectional areas of tuning passage 357 and piston 347 are determined, and the tuning fluid is chosen, the operation of LIVE unit 327 is set, and cannot be altered without altering one or more of these features. On the other hand, the present application provides a means of actively tuning the functionality a LIVE unit during operation.

Figure 4C:
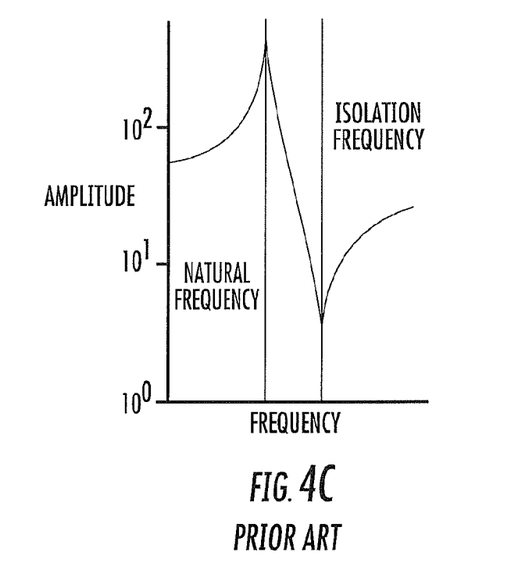
FIG. 4C is a plot of amplitude versus frequency for the prior art liquid inertia vibration eliminator of FIG. 4A.

Referring now to FIG. 4C in the drawings, a plot of amplitude versus frequency for LIVE unit 327 and mechanical equivalent model 375 is illustrated.

Figure 5:
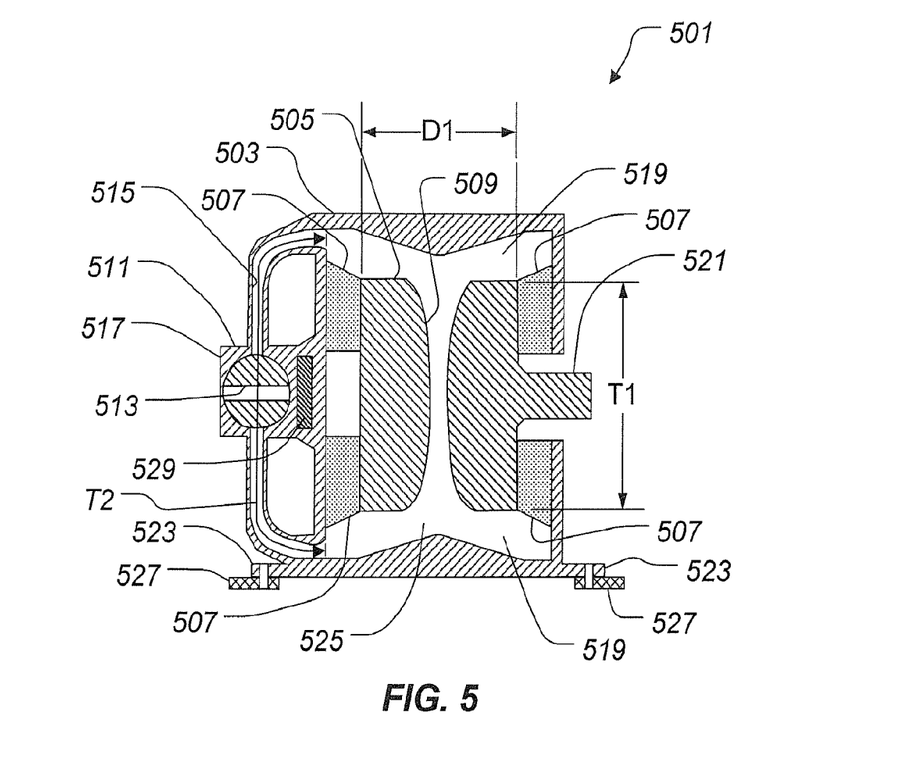
FIG. 5 is a cross-sectional view of a switchable fluid path liquid inertia vibration eliminator according to the preferred embodiment of the present application.

Referring now to FIG. 5 in the drawings, a switchable fluid path liquid inertia vibration eliminator 501 according to the preferred embodiment of the present application is illustrated. Vibration isolator 501 comprises a housing 503 that has a hollow interior. A piston assembly 505 is at least partially disposed within the interior of housing 503. Piston assembly 505 is typically coupled to a vibrating body, such as a transmission of an aircraft (not shown) via a pylon assembly (not shown) at a piston bracket 521. Housing 503 is typically coupled to a body to be isolated from vibration, such as a roof beam 527 of an airframe of an aircraft. In such an arrangement, the airframe serves as the body to be isolated from vibration, and the transmission of the aircraft serves as the vibrating body. An elastomer seal and spring member 507 seals and resiliently locates piston assembly 505 within the interior of housing 503. Elastomer member 507 functions at least as a spring to permit piston assembly 505 to move or oscillate relative to housing 503. When no load is applied, elastomer member 507 locates piston assembly 505 generally central in housing 503. Piston assembly 505 defines a generally elongated tuning passage 509 and includes piston bracket 521. A fluid chamber 519 is generally defined by the interior of housing 503 and piston assembly 505.

Tuning passage 509 extends centrally through a longitudinal axis of piston assembly 505, so as to essentially divide fluid chamber 519 into two volumes that are in fluid communication. The approximate length of tuning passage 509, in relation to the physical features of piston assembly 505, is defined by T1 in FIG. 5. Tuning passage 509 is generally circular in cross-section and tapered longitudinally in order to improve fluid flow.

A switchable fluid path assembly 511 generally consists of fluid path 515, valve 513, a valve support 517, and a valve actuator 529. Valve 513 is carried by valve support 517 and is shown in FIG. 5 in the closed position; however, valve 513 is able to be opened or closed via valve actuator 529. A Tuning fluid 525 is disposed in fluid chamber 519, tuning passage 509, valve 513, and fluid path 515. Tuning fluid 525 preferably has low viscosity, relatively high density, and non-corrosive properties. When valve 513 is open, tuning fluid 525 is able to flow through fluid path 515 in either direction. Valve actuator 529 is shown as being part of vibration eliminator 501, but can also be located apart from vibration eliminator 501. It should be understood that valve actuator 529 can be an electric actuator, hydraulic actuator, pneumatic actuator, electromagnetic actuator, shape memory alloy, or any device sufficient to open or close valve 529.

The introduction of a force into piston bracket 521 translates piston assembly 505 relative to housing 503. When valve 513 is closed, the movement of piston assembly 505 forces tuning fluid 525 to move solely through tuning passage 509. Movement of tuning fluid 525 produces an inertial force that cancels, or isolates, the force from piston assembly 505 at a discrete frequency, i.e., isolation frequency. When valve 513 is open, the movement of piston assembly 505 forces tuning fluid 525 partly through tuning passage 509 and partly through fluid path 515. As explained below, the isolation frequency of vibration eliminator 501 is different when valve 513 is open versus when valve 513 is closed.

Vibration eliminator 501 has the ability to treat different isolation frequencies depending on whether valve 513 is open or closed. When valve 513 is open, vibration eliminator 501 is able to isolate a higher frequency as compared to when valve 513 is closed. Therefore, when vibration eliminator 501 consists of only one fluid path 515 in addition to tuning passage 509, then vibration eliminator 501 is able to selectively isolate two different frequencies. The isolation frequency ($f_i$) of vibration eliminator 501 is can be represented by the following equation:

$$f_i = \frac{1}{2\pi}\sqrt{\frac{K}{R(R-1)m_t}}$$

In the above equation, R represents the ratio of the functional volume $V_p$ of piston assembly 505 to the total volume $V_T$ inside both the tuning passage 509 and fluid path 515 (only if valve 513 is open). As such, $R=V_p/V_T$. The volume $V_{TP}$ of tuning passage 509 is the diameter of tuning passage 509 multiplied by the length T1. The volume $V_{FP}$ of fluid path 515 is the diameter of fluid path 515 multiplied by the length T2. Therefore, $V_T=V_{TP}+V_{FP}$. $V_p$ is the functional diameter D1 of piston assembly 505 multiplied by the length T1 of the piston assembly 505, i.e., $V_p$=D1*T1. Mass of tuning fluid 525 is represented by $m_t$. The spring rate of elastomer member 507 is represented by K.

Figure 6:
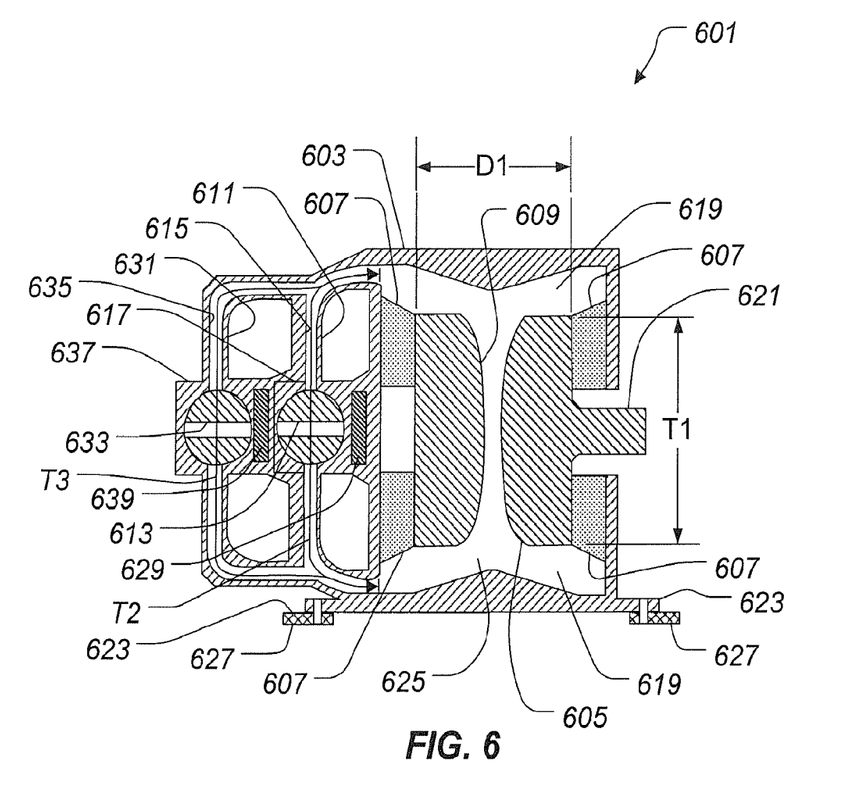
FIG. 6 is a cross-sectional view of an alternative embodiment of a switchable fluid path liquid inertia vibration eliminator according to the present application.

Referring now to FIG. 6 in the drawings, an alternative embodiment of a switchable fluid path liquid inertia vibration eliminator 601 is illustrated. Vibration isolator 601 comprises a housing 603 that has a hollow interior. A piston assembly 605 is at least partially disposed within the interior of housing 603. Piston assembly 605 is typically coupled to a vibrating body, such as a transmission of an aircraft (not shown) via a pylon assembly (not shown) at a piston bracket 621. Housing 603 is typically coupled to a body to be isolated from vibration, such as a roof beam 627 of an airframe of an aircraft. In such an arrangement, the airframe serves as the body to be isolated from vibration, and the transmission of the aircraft serves as the vibrating body. An elastomer seal and spring member 607 seals and resiliently locates piston assembly 605 within the interior of housing 603. Elastomer member 607 functions at least as a spring to permit piston assembly 605 to move or oscillate relative to housing 603. When no load is applied, elastomer member 607 locates piston assembly 605 generally central in housing 603. Piston assembly 605 defines a generally elongated tuning passage 609 and includes piston bracket 621. This alternative embodiment vibration eliminator 601 has two switchable fluid path assemblies 611, 631, but may be any plurality of switchable fluid path assemblies. A fluid chamber 619 is generally defined by the interior of housing 603 and piston assembly 605.

Tuning passage 609 extends centrally through a longitudinal axis of piston assembly 605, so as to essentially divide fluid chamber 619 into two volumes that are in fluid communication. The approximate length of tuning passage 609, in relation to the physical features of piston assembly 605, is defined by T1 in FIG. 5. Tuning passage 609 is generally circular in cross-section and tapered longitudinally in order to improve fluid flow.

Each switchable fluid path assembly 611, 631 generally consists of fluid path 615, 635, valve 613, 633, a valve support 617, 637, and a valve actuator 629, 639, respectively. Switchable fluid path assembly 611 is able to function independent of switchable fluid path assembly 631. Each valve 613, 633 is carried by a valve support 617, 637 and is shown in the closed position; however, each valve 613, 633 is able to be opened or closed via valve actuators 629, 639. Tuning fluid 625 is disposed in fluid chamber 619, tuning passage 609, valves 613, 633, and fluid paths 615 635. Tuning fluid 625 preferably has low viscosity, relatively high density, and non-corrosive properties. When valves 613, 633 are open, tuning fluid 625 is able to flow through fluid paths 615, 635 in either direction. Valve actuators 629, 639 are shown as being part of vibration eliminator 601, but can also be located apart from vibration eliminator 601. It should be understood that valve actuators 629, 639 can be an electric actuator, hydraulic actuator, pneumatic actuator, electromagnetic actuator, shape memory alloy, or any device sufficient to open or close valves 629, 639.

The introduction of a force into piston bracket 621 translates piston assembly 605 relative to housing 603. When both valves 613, 633 are closed; the movement of piston assembly 605 forces tuning fluid 625 to move solely through tuning passage 609. Movement of tuning fluid 625 produces an inertial force that cancels, or isolates, the force from piston assembly 605 at a discrete frequency, i.e. isolation frequency. When valve 613 is open, but valve 633 is closed; the movement of piston assembly 605 forces tuning fluid 625 partly through tuning passage 609 and partly through fluid path 615. When valve 613 is closed, but valve 633 is open; the movement of piston assembly 605 forces tuning fluid 625 partly through tuning passage 609 and partly through fluid path 635. When both valves 613, 633 are open, the movement of piston assembly 605 forces tuning fluid 625 partly through tuning passage 609 and partly through both fluid paths 615, 635. As explained below, the isolation frequency of vibration eliminator 601 is different in each of the following scenarios: both valves 613, 633 are closed, valve 613 is open while valve 633 is closed, valve 613 is closed while valve 633 is open, and both valves 613, 633 are open. Vibration eliminator 601 may have additional switchable fluid path assemblies, similar to switchable fluid path assemblies 611, 631, which would provide additional available isolation frequencies.

Vibration eliminator 601 has the ability to treat different isolation frequencies depending on whether valves 613, 633 are open or closed. When only valve 613 is open, vibration eliminator 601 is able to isolate a higher frequency as compared to when both valves 613, 633 are closed. When valve 613 is closed, but valve 633 is open, then the isolation frequency of vibration eliminator 601 is still different than when valve 613 is open but valve 633 is closed. This is because the size and length of fluid paths 615, 635 will be different in order to provide an additional isolation frequency. When both valves 613, 633 are open, vibration eliminator 601 is able to isolate even a higher frequency as compared to when only either valve 613 or 633 is open. Therefore, when vibration eliminator 601 consists of two fluid paths 615, 635 in addition to tuning passage 609, then vibration eliminator 601 is able to selectively isolate four different frequencies. The isolation frequency ($f_i$) of vibration eliminator 601 is can be represented by the following equation:

$$f_i = \frac{1}{2\pi}\sqrt{\frac{K}{R(R-1)m_t}}$$

In the above equation, R represents the ratio of the functional volume $V_p$ of piston assembly 605 to the total volume $V_T$ of both the tuning passage 609, fluid path 635, and fluid path 615 (only if both valves 613, 635 are open). As such, R=$V_p/V_T$. The volume $V_{TP}$ of tuning passage 609 is the diameter of tuning passage 609 multiplied by the length T1. The volume $V_{FP1}$ of fluid path 615 is the diameter of fluid path 615 multiplied by the length T2. The volume $V_{FP2}$ of fluid path 635 is the diameter of fluid path 635 multiplied by the length T3. Therefore, $V_T$=$V_{TP}$+$V_{FP1}$+$V_{FP2}$. $V_p$ is the functional diameter D1 of piston assembly 605 multiplied by the length T1 of the piston assembly 605, i.e., $V_p$=D1*T1. Mass of tuning fluid 625 is represented by $m_t$. The spring rate of elastomer member 607 is represented by K.

Figure 7:
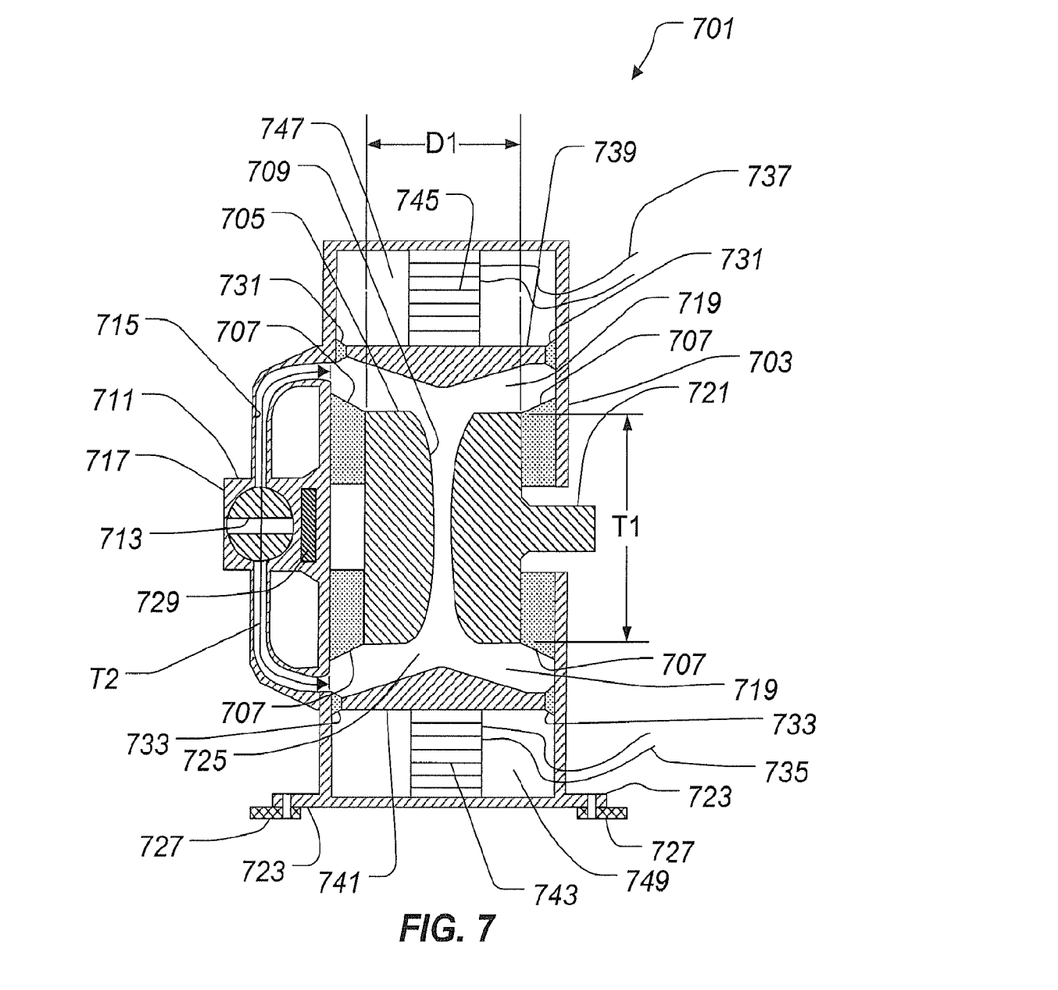
FIG. 7 is a cross-sectional view of another alternative embodiment of a switchable fluid path liquid inertia vibration eliminator according to the present application.

Referring now to FIG. 7 in the drawings, another alternative embodiment of a switchable fluid path liquid inertia vibration eliminator is illustrated. In this embodiment, a switchable fluid path liquid inertia vibration eliminator 701 includes the addition of active tuning elements. Vibration isolator 701 comprises a housing 703 that has a hollow interior. A piston assembly 705 is at least partially disposed within the interior of housing 703. Piston assembly 705 is typically coupled to a vibrating body, such as a transmission of an aircraft (not shown) via a pylon assembly (not shown) at a piston bracket 721. Housing 703 is typically coupled to a body to be isolated from vibration, such as a roof beam 727 of an airframe of an aircraft. In such an arrangement, the airframe serves as the body to be isolated from vibration, and the transmission of the aircraft serves as the vibrating body. An elastomer seal and spring member 707 seals and resiliently locates piston assembly 705 within the interior of housing 703. Elastomer member 707 functions at least as a spring to permit piston assembly 705 to move or oscillate relative to housing 703. When no load is applied, elastomer member 707 locates piston assembly 705 generally central in housing 703. Piston assembly 705 defines a generally elongated tuning passage 709 and includes piston bracket 721. A fluid chamber 719 is generally defined by the interior of housing 703, an upper actuating piston 739, a lower actuating piston 741, and piston assembly 705.

Tuning passage 709 extends centrally through a longitudinal axis of piston assembly 705, so as to essentially divide fluid chamber 719 into two volumes that are in fluid communication. The approximate length of tuning passage 709, in relation to the physical features of piston assembly 705, is defined by T1 in FIG. 5. Tuning passage 709 is generally circular in cross-section and tapered longitudinally in order to improve fluid flow.

Upper cavity 747 is defined by the interior of housing 703 and upper actuating piston 739. Lower cavity 749 is defined by the interior of housing 703 and lower actuating piston 741. Elastomer seal and spring members 731, 733 seal and resiliently locate actuating pistons 739, 741 to housing 703. Each elastomer member 731, 733 also function as a spring by allowing each upper actuating piston 739 and lower actuating piston 741 to each translate relative to housing 703.

A first tunable active tuning element 745 is operably associated with upper actuating piston 739. A second tunable active tuning element 743 is operably associated with lower actuating piston 741. First and second active tuning elements 745, 743 are electrically coupled via electrical leads 737, 735 to control circuitry (not shown) for controlling the actuation of actuating pistons 739, 741, respectively. Actuation of actuating pistons 739, 741 at selected frequencies and amplitudes amplify the displacement of tuning fluid 725 and cancel out the frequency of the oscillatory forces from a vibrating body (not shown). In this manner, the oscillatory vibrations from the vibrating body are prevented from transferring to the body to be isolated.

It is preferred that active tuning elements 743 and 745 are piezoceramic elements that oscillate in the range of about 16.6 Hz to about 19.9 Hz to counteract vibration from the vibrating body (not shown). However, it should be understood that active tuning elements 743 and 745 may be comprised of other smart materials, such as magnetostrictive, or may comprise other means, such as electromagnetic, pneumatic, hydraulic, and the like.

A switchable fluid path assembly 711 generally consists of fluid path 715, valve 713, a valve support 717, and a valve actuator 729. Valve 713 is carried by valve support 717 and is shown in the closed position; however, valve 713 is able to be open or closed via valve actuator 729. Tuning fluid 725 is disposed in fluid chamber 719, tuning passage 709, valve 713, an upper cavity 747, a lower cavity 749, and fluid path 715. Tuning fluid 725 preferably has low viscosity, relatively high density, and non-corrosive properties. When valve 713 is open, tuning fluid 725 is able to flow through fluid path 715 in either direction. Valve actuator 729 is shown as being part of vibration eliminator 701, but can also be located apart from vibration eliminator 701. It should be understood that valve actuator 729 can be an electric actuator, hydraulic actuator, pneumatic actuator, electromagnetic actuator, shape memory alloy, or any device sufficient to open or close valve 729.

The introduction of a force into piston bracket 721 translates piston assembly 705 relative to housing 703. When valve 713 is closed; the movement of piston assembly 705 forces tuning fluid 725 to move solely through tuning passage 709. Movement of tuning fluid 725 produces an inertial force that cancels, or isolates, the force from piston assembly 705 at a discrete frequency, i.e. isolation frequency. When valve 713 is open; the movement of piston assembly 705 forces tuning fluid 725 partly through tuning passage 709 and partly through fluid path 715. As explained below, the isolation frequency of vibration eliminator 701 is different when valve 713 is open versus when valve 713 is closed.

Vibration eliminator 701 has the ability to treat different isolation frequencies depending on whether valve 713 is open or closed. When valve 713 is open, vibration eliminator 701 is able to isolate a higher frequency as compared to when valve 713 is closed. Therefore, when vibration eliminator 701 consists of only one fluid path 715 in addition to tuning passage 709, then vibration eliminator 701 is able to selectively isolate two different frequencies. The isolation frequency ($f_i$) of vibration eliminator 701 is can be represented by the following equation:

$$f_i = \frac{1}{2\pi}\sqrt{\frac{K}{R(R-1)m_t}}$$

In the above equation, R represents the ratio of the functional volume $V_p$ of piston assembly 705 to the total volume $V_T$ inside both the tuning passage 709 and fluid path 715 (only if valve 713 is open). As such, $R=V_p/V_T$. The volume $V_{TP}$ of tuning passage 709 is the diameter of tuning passage 709 multiplied by the length T1. The volume $V_{FP}$ of fluid path 715 is the diameter of fluid path 715 multiplied by the length T2. Therefore, $V_T=V_{TP}+V_{FP}$. $V_p$ is the functional diameter D1 of piston assembly 705 multiplied by the length T1 of the piston assembly 705, i.e., $V_p$=D1*T1. Mass of tuning fluid 725 is represented by $m_t$. The spring rate of elastomer member 707 is represented by K.

Vibration eliminator 701 has the ability to continuously track frequency isolation by having switchable fluid path assembly 711 and having upper and lower cavities 747, 749 with active tuning elements 743, 745. It should be noted that vibration eliminator 701 may employ multiple switchable fluid path assemblies 711 in order to provide greater isolation frequency range.

It is apparent that an application with significant advantages has been described and illustrated. Although the present application is shown in a limited number of forms, it is not limited to just these forms, but is amenable to various changes and modifications without departing from the spirit thereof.

The invention claimed is:
1. A vibration isolator, comprising:
   a housing defining a fluid chamber having opposing ends;
   a fluid disposed within the fluid chamber;
   a piston assembly resiliently disposed within the housing longitudinally between the opposing ends of the fluid chamber, the piston assembly comprising a piston bracket that extends laterally through an opening of the housing, and the piston assembly comprising an elastomer member disposed between the piston and the housing;
   an unobstructed tuning passage extending centrally through the piston, for providing continuous fluid communication between the ends of the fluid chamber;
   a switchable fluid path assembly in fluid communication with the fluid chamber for selectively changing a range of isolation frequencies by selectively allowing bidirectional supplemental fluid communication between the ends of the fluid chamber; and at least one additional switchable fluid path assembly for providing at least one additional isolation frequency to the range of isolation frequencies by allowing bidirectional supplemental fluid communication between the ends of the fluid chamber, both switchable fluid path assemblies functioning independent of each other between an open position and a closed position;

wherein introduction of a force to the piston causes the piston to move, thereby causing a movement of the fluid through the tuning passage, the movement of the fluid through the tuning passage producing an inertial force that cancels the force from the piston at the isolation frequency;

wherein the switchable fluid path assembly and the at least one additional switchable fluid path assembly are at least partial coextensive; and wherein the at least partially coextensive portion of the switchable fluid path assembly and the at least one additional fluid path assembly is disposed so that a longitudinal distance between the coextensive portion and at least one of the opposing ends is shorter than a longitudinal distance between the elastomer member and the at least one of the opposing ends.

2. The vibration isolator according to claim 1, wherein the switchable fluid path assembly comprises:
a fluid path providing fluid communication between each end of the fluid chamber; and
a valve for selectively controlling fluid flow in the fluid path.

3. The vibration isolator according to claim 1, wherein the piston is resiliently coupled to the housing with at least one elastomer member.

4. The vibration isolator according to claim 1, wherein the fluid has a low viscosity and a high density.

5. The vibration isolator according to claim 1, wherein the additional switchable fluid path assembly comprises:
an additional valve for selectively controlling fluid flow in the additional fluid path.

6. The vibration isolator according to claim 2, wherein the switchable fluid path assembly further comprises:
a valve actuator operably associated with the valve for selectively adjusting fluid flow in the fluid path.

7. The vibration isolator according to claim 6, wherein the valve actuator is an actuation device selected from the group consisting of:
an electric actuator;
a hydraulic actuator;
a pneumatic actuator;
an electromagnetic actuator; and
a shape memory alloy.

8. The vibration isolator according to claim 1, wherein the housing is configured for coupling to a roof beam of an aircraft.

9. The vibration isolator according to claim 1, wherein the piston assembly is configured for coupling to a pylon assembly of an aircraft.

10. A vibration isolator, comprising:
a housing defining a fluid chamber having opposing ends;
a fluid disposed within the isolator;
a piston assembly resiliently disposed within the isolator longitudinally between the opposing ends of the fluid chamber, the piston assembly comprising a piston bracket that extends laterally through an opening of the housing, and the piston assembly comprising an elastomer member disposed between the piston and the housing;
an unobstructed tuning passage extending centrally through the piston, for providing continuous fluid communication between the ends of the fluid chamber; and
a switchable fluid path assembly in fluid communication with the fluid chamber and configured to selectively change a volume of the fluid that is able to travel to and from opposing ends of the fluid chamber for selectively changing a range of isolation frequencies; and
at least one additional switchable fluid path assembly for providing at least one additional isolation frequency to the range of isolation frequencies by allowing bidirectional supplemental fluid communication between the ends of the fluid chamber, both switchable fluid path assemblies functioning independent of each other between an open position and a closed position;
at least one tuning element operably associated with at least one of an upper fluid chamber and a lower fluid chamber; and
an actuating piston coupled to each tuning element for amplifying the displacement of the fluid in the corresponding fluid chamber;
wherein introduction of a force to the piston causes the piston to move, thereby causing a movement of the fluid through the tuning passage, the movement of the fluid through the tuning passage producing an inertial force that cancels the force from the piston at the isolation frequency;
wherein the switchable fluid path assembly and the at least one additional switchable fluid path assembly are at least partial coextensive; and
wherein the at least partially coextensive portion of the switchable fluid path assembly and the at least one additional fluid path assembly is disposed so that a longitudinal distance between the coextensive portion and at least one of the opposing ends is shorter than a longitudinal distance between the elastomer member and the at least one of the opposing ends.

11. The vibration isolator according to claim 10, wherein the tuning element comprises a material selected from the group consisting of:
piezoceramic;
magnetostrictive; and
electromagnetic.

12. The vibration isolator according to claim 10, wherein the switchable fluid path assembly comprises:
a fluid path providing fluid communication between each end of the fluid chamber; and
a valve for selectively controlling fluid flow in the fluid path.

13. The vibration isolator according to claim 10, wherein each tuning element is electrically coupled via electrical leads to control circuitry for controlling the actuation of actuating pistons.

14. The vibration isolator according to claim 10, wherein the tuning fluid has a low viscosity and a high density.

15. A method of changing an isolation frequency in a vibration isolator, comprising:
providing a housing defining a fluid chamber, the fluid chamber having opposing ends that are in fluid communication by an unobstructed tuning passage;
resiliently disposing a piston within the housing longitudinally between the opposing ends of the fluid chamber, the piston forming the unobstructed tuning passage within the fluid chamber, the tuning passage extending centrally through the piston and located within the piston, wherein a piston bracket extends laterally through an opening of the housing and an elastomer member is disposed between the piston and the housing;

providing a fluid disposed within the fluid chamber;

operably associating a switchable fluid path assembly for changing the isolation frequency of the vibration isolator;

operably associating at least one additional switchable fluid path assembly for changing the isolation frequency of the vibration isolator, each switchable fluid path assembly independently alternating between an open position and a closed position, the switchable fluid path assemblies providing bidirectional fluid communication between the ends of the fluid chamber which is supplemental to the tuning passage; and selectively actuating a valve in the switchable fluid path assembly, thereby changing a selected range of isolation frequencies of the vibration isolator;

wherein introduction of a force to the piston causes the piston to move, thereby causing a movement of the fluid through the tuning passage, the movement of the fluid through the tuning passage producing an inertial force that cancels the force from the piston at the isolation frequency;

wherein the switchable fluid path assembly and the at least one additional switchable fluid path assembly are at least partial coextensive; and wherein the at least partially coextensive portion of the switchable fluid path assembly and the at least one additional fluid path assembly is disposed so that a longitudinal distance between the coextensive portion and at least one of the opposing ends is shorter than a longitudinal distance between the elastomer member and the at least one of the opposing ends.

16. The method according to claim 15, further comprising:

providing at least one tuning element operably associated with at least one tuning chamber; and selectively actuating a piston coupled to each tuning element for amplifying the displacement of a fluid in the fluid chamber.

\* \* \* \* \*